United States Patent [19]

Church et al.

[11] Patent Number: 4,724,013

[45] Date of Patent: * Feb. 9, 1988

[54] PROCESSING OF COPPER ALLOYS AND PRODUCT

[75] Inventors: Nathan L. Church, Chagrin Falls; W. Raymond Cribb, Mentor; John C. Harkness, Lakewood, all of Ohio

[73] Assignee: Brush Wellman, Inc., Cleveland, Ohio

[*] Notice: The portion of the term of this patent subsequent to Nov. 5, 2002 has been disclaimed.

[21] Appl. No.: 795,200

[22] Filed: Nov. 5, 1985

Related U.S. Application Data

[63] Continuation-in-part of Ser. No. 618,528, Jun. 8, 1984, Pat. No. 4,551,187, and a continuation-in-part of Ser. No. 623,463, Jun. 22, 1985, Pat. No. 4,565,568.

[51] Int. Cl.⁴ .............................................. C22F 1/08
[52] U.S. Cl. .................... 148/12.7 C; 148/411
[58] Field of Search .......................... 148/12.7 C, 411

[56] References Cited

U.S. PATENT DOCUMENTS 4,565,586  1/1986  Church et al. ............... 148/12.7 C

FOREIGN PATENT DOCUMENTS 56-163248  12/1981  Japan .

Primary Examiner—R. Dean
Attorney, Agent, or Firm—Hopgood, Calimafde, Kalil, Blaustein & Judlowe

[57] ABSTRACT

This invention is directed to the treatment of copper beryllium alloys, and to articles and parts made therefrom, containing special small amounts of beryllium and cobalt, e.g., about 0.2% to about 0.5% beryllium and about 0.2% to about 1% or about 1.5% or about 2% cobalt, which imparts to these alloys a superior combination of stress relaxation resistance, formability, ductility, conductivity and strength by the process of solution annealing, cold working at least about 50% or at least about 70% or 90% or more and age hardening.

8 Claims, 6 Drawing Figures

PROCESSING OF COPPER ALLOYS AND PRODUCT

The present application is a continuation-in-part of our copending application Ser. No. 618,528 filed June 8, 1984 now U.S. Pat. No. 4,551,187, and Ser. No. 623,463 filed June 22, 1985 now U.S. Pat. No. 4,565,568.

The present invention is directed to a metallurgical process for wrought copper alloys, specifically alloys containing small interrelated amounts of beryllium and cobalt, to produce useful articles having an improved combination of stress relaxation resistance, formability, conductivity and strength.

BACKGROUND OF THE INVENTION AND THE PRIOR ART

Copper beryllium alloys have been used commercially for approximately fifty years in applications requiring high strength, formability, stress relaxation resistance and conductivity. Commercial copper beryllium alloys include those wrought alloys bearing Copper Development Association designations C17500, C17510, C17000, C17200 and C17300. General development of copper beryllium alloys and the processes to manufacture them have proceeded in the direction of providing premium performance, i.e., the highest strengths, best ductilities and other highly desirable attributes, by taking advantage of the precipitation hardening characteristics of these alloys. Thus, U.S. Pat. Nos. 1,893,984, 1,957,214, 1,959,154, 1,974,839, 2,131,475, 2,166,794, 2,167,684, 2,172,639 and 2,289,593 disclose various wrought alloys containing varying amounts of beryllium and other elements.

In the fifty or so years since the above-discussed patents were granted, whole new industries have appeared and new sets of requirements have been imposed on alloy producers. Thus, the requirements of the electronics and computer industries were unknown in the 1930's. Even the trends toward miniaturization in electronics and computers have arisen and proceeded at an accelerating pace only in the past few years. In the provision of spring-type connectors and contacts, the complexity of the devices needed, and the requirements for heat dissipation, as well as for survival of parts at elevated temperatures without failure due to stress relaxation, have proceeded apace. In addition, purchasers have become increasingly price-conscious and connector alloys such as phosphor bronzes C51000 and C52100 have been employed due to cost eve though the inferior performance of such alloys, such as in poorer conductivity, poorer formability and lower stress relaxation resistance as compared to beryllium copper alloys, was known. Moreover, the formability requirements, which are of importance in the production of complex parts from strip or wire using progressive dies and other metal forming technologies, have elevated the difficulties imposed upon alloy suppliers as compared to the simpler days of U.S. Pat. No. 2,131,475 wherein the copper beryllium welding electrode described is merely a bar of wrought or cast metal which had to resist "mushrooming" under load, but with respect to which no formability requirement was imposed.

Processes to produce wrought forms (i.e., strip, plate, wire, rod, bar tube, etc) of copper beryllium alloys in the prior art have generally focused on the premium performance alloys with beryllium and major third element contents reminiscent of the composition of commercial alloys C17500, C17510 and C17200. These processes have generally included the steps of preparing the molten alloy, casting an ingot, converting the ingot to a wrought form by hot and/or cold working with optional intermediate anneals to maintain workability of the alloy, solution annealing the wrought form by heating to a temperature sufficient to effect recrystallization of the alloy and solid solution of the beryllium in the copper matrix and then rapidly quenching the alloy to retain the beryllium in supersaturated solid solution, optionally cold working the solution annealed wrought form a predetermined amount to enhance the subsequent age hardened strength, then age hardening the optionally cold worked wrought form at temperatures less than the solution annealing temperature to achieve desirable combinations of strength and ductility. This art is disclosed in U.S. Pat. Nos. 1,893,984, 1,959,154, 1,974,839, 1,975,113, 2,027,750, 2,527,983, 3,196,006, 3,138,493, 3,240,635, 4,179,314 and 4,425,168 which also teach that optimum solution annealing and aging temperature ranges are dependent upon alloy composition, and that age hardening may be performed either before or after the solution annealed and optionally cold worked wrought form is fabricated into a article of manufacture (e.g., an electrically conductive spring, pressure welding electrode, or similar device) by well-known metal forming technologies.

Copper-base alloys of the prior art which are not age hardenable (such as C51000 and C52100 phosphor bronzes) and which derive their strength solely from work hardening are frequently cold worked substantially beyond 50% reduction in area in order to achieve commercially significant strength levels. In the case of copper beryllium alloys of the prior art, final cold work applied between solution annealing and age hardening, other than that associated with any parts-fabrication metal forming operations, generally is confined to levels less than about 50% reduction. Thus, U.S. Pat. Nos. 3,138,493, 3,196,006, 4,179,314 and 4,425,168 describe processes involving a minimum of 3% to a maximum of 42% cold reduction prior to age hardening. One explanation of this restriction on cold work in the commercial copper beryllium alloys of the prior art is given in the 1982 publication "Wrought Beryllium Copper" by Brush Wellman Incorporated, which shows that as-rolled ductility (and hence formability - the minimum bend radius for no cracking when bent 90° or 180° in a forming operation) degrades to commercially unacceptable levels as pre-aging cold work increases beyond about 40% reduction, and that post-cold working age hardened strength exhibits a relative maximum at about 30% to 40% cold reduction, but decreases with larger amounts of cold work when the alloys are aged at commercially recommended temperatures.

Copending application Ser. No. 550,631 by Amitava Guha, assigned to Brush Wellman Inc., describes an improved process for commercial copper-beryllium-nickel alloy C17510 involving cold work of up to about 90% intermediate to a special nickel-rich precipitate-forming high temperature solution annealing treatment and a low temperature age hardening step, the whole intended to develop strength and electrical conductivity combinations previously unobtainable in C17510, with little or no sacrifice in formability and resistance to stress relaxation.

The property of stress relaxation is an important design parameter which can give the designer assurance that a particular contact or connector or like device will maintain the required contact pressure to assure long-life performance of an assembly including the device. Stress relaxation is defined as the decrease of stress at constant strain with time for a given temperature. From a knowledge of the stress relaxation behavior of a material, a designer can determine how much the room temperature spring force must be increased to assure a particular minimum force at operating temperature to maintain electrical contact between mating parts for an extended time period.

The stronger beryllium-containing age hardenable alloys such as C17200, which contains about 2% beryllium, are known to have high resistance to stress relaxation. On the other hand, the considerably cheaper phosphor bronzes, such as C51000 and C52100, which are non-agehardenable and have to be severely cold worked to achieve high strength, are poor with respect to resistance to stress relaxation.

As used herein, stress relaxation resistance is determined by the test described in the paper entitled "Stress Relaxation of Beryllium Copper Strip in Bending" by Harkness and Lorenz presented at the 30th Annual Relay Conference, Stillwater, Okla., Apr. 27-28, 1982. In accordance with this test, flat spring specimens having a tapered gage length are stressed in a fixture to a constant initial stress level and are exposed with the fixture in the stressed condition to an elevated temperature such as 300° F. (150° C.) for an extended time period. Periodically, a specimen is removed and measured to determine the amount of permanent set the material has undergone, from which the percent of remaining stress value can be calculated.

Formability is determined by bending a flat strip specimen about a punch having a nose of variable known radius with failure being taken as the point at which cracking occurs in the outer fibers of the bend. A rating is given for the test from the quantity R/t wherein "R" is the radius of the punch nose and "t" is the thickness of the strip. The rating can be used by designers to determine whether a particular material can be formed to the geometry desired in a particular part.

The invention provides a process to produce age hardenable copper beryllium alloys having a stress-relaxation resistance closely approaching that of the strongest copper beryllium alloys of commerce together with high formability and ductility, high conductivity and useful strength.

SUMMARY OF THE INVENTION

Figure 1:
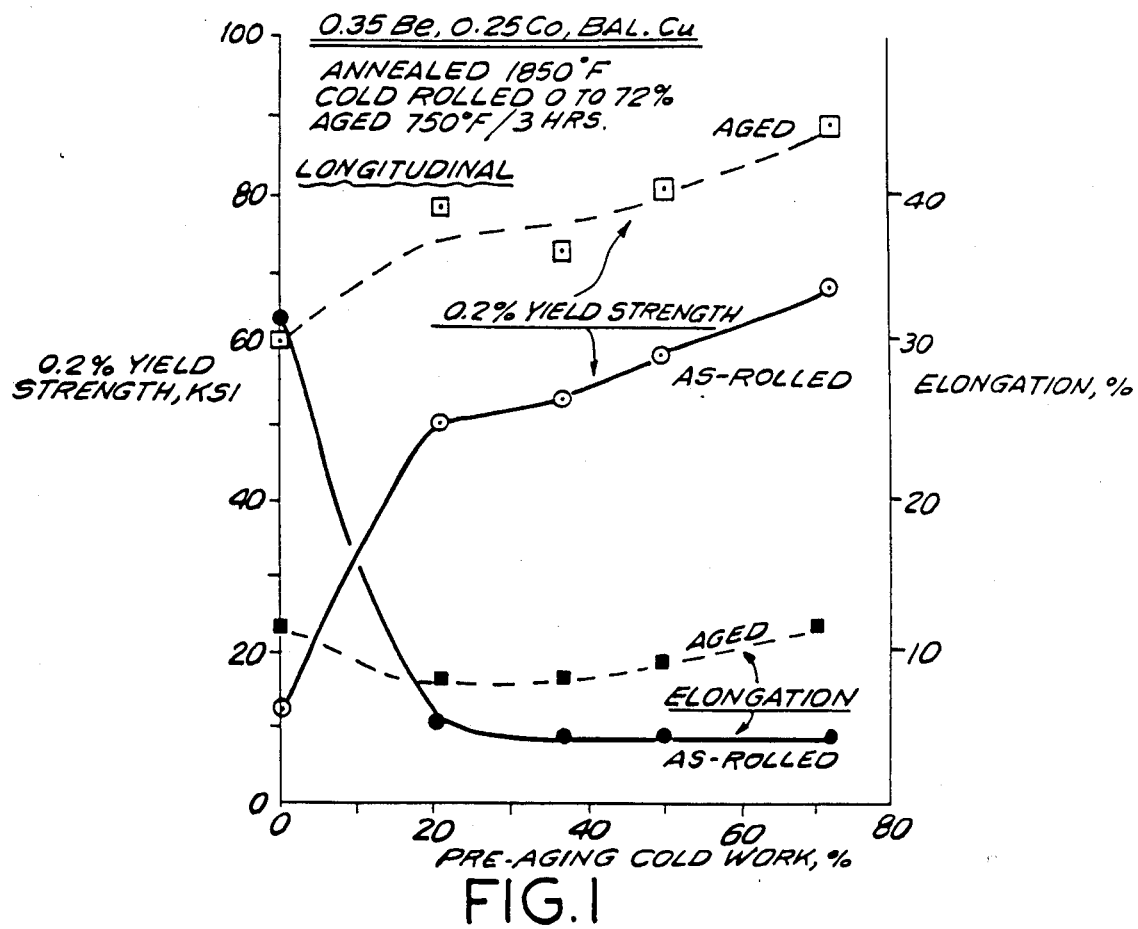
FIG. 1 depicts the influence of cold work from 0 to 72% reduction in area on the strength and ductility of strip made from an alloy within the range of the invention, containing 0.35% beryllium, 0.25% cobalt, balance essentially copper and solution annealed at 1850° F. (1000° C.), in both the as-rolled condition and after cold rolling plus age hardening 3 hours at 750° F. (400° C.)

The invention is directed to the treatment of copper beryllium alloys containing about 0.2% to about 0.5% beryllium and about 0.2% to about 1% or about 2% cobalt by solution annealing said alloy in the temperature range of about 1450° F. (790° C.) to about 1850° F. (1000° C.), preferably about 1600° F. (870° C.) to about 1700° F. (930° C.), cold working said alloy to reduce the section thickness thereof by at least about 50%, preferably at least about 70% to about 95%, and aging said cold worked alloy in the temperature range of about 600° F. to about 1000° F. (315° C. to about 540° C.) to provide in said aged alloy a high combination of stress relaxation resistance, formability, ductility, conductivity and strength.

DETAILED DESCRIPTION OF THE INVENTION

The invention is grounded in the discovery that beryllium copper alloys having small, definite contents of beryllium and of cobalt are capable of providing highly useful combinations of stress relaxation resistance, formability and ductility, conductivity and strength when processed by solution treating, heavy cold working and aging. Indeed, we have discovered that as these alloys are age hardened after cold working in excess of about 50% reduction in area, both strength, as measured by the 0.2% offset yield strength, and ductility, as measured by tensile elongation, improve considerably with increasing cold work up to about 95% reduction or more compared to aged material with cold work of less than 50%. The alloys contain about 0.2% to about 0.5% beryllium and about 0.2% to about 1% or about 1.5% or about 2% cobalt, and the processing which is applied after any hot or cold working required to convert the original cast ingot to an intermediate shape of appropriate dimension, comprises a solution treatment in the temperature range of about 1450° F. (790° C.) to about 1850° F. (1000° C.), preferably about 1600° F. (870° C.) to about 1700° F. (930° C.), followed by cold working, as by rolling, to reduce the section of the intermediate shape by at least about 50% up to about 70% to about 95% or more followed by aging the resulting cold worked shape in the temperature range of about 600° F. to about 1000° F. (315° C. to about 540° C.) for less than about one hour to about 8 hours. The treatment differs from the commercia processing of copper beryllium alloys in the extent of cold work applied to the alloys prior to aging.

The treatment provides in the alloys, which are low in alloy constituents as compared to commercially produced wrought copper beryllium alloys, a useful and quite unexpected combination of properties. In particular, the alloys display a superior combination of stress relaxation resistance, formability and ductility and conductivity as compared to existing bronze and brass alloys, e.g., the phosphor bronzes, having similar strength.

The alloys may be cast to ingot using conventional static, semi-continuous or continuous casting techniques. The ingots may readily be worked, as by hot or cold rolling, without difficulty. Intermediate anneals at temperatures between about 1000° F. (540° C.) and 1750° F. (955° C.) may be employed. Once the ingot is reduced to the desired intermediate gage, from which cold reduction to desired final gage with a predetermined amount of cold work may be imposed, a solution anneal is employed. Solution annealing is accomplished at temperatures of about 1450° F. (790° C.) or 1500° F. (815° C.) to about 1700° F. (930° C.) to 1850° F. (1000° C.). The lowest temperatures will not effect complete recrystallization in some alloys, while intermediate temperatures will give finer grain size and better formability but with poorer strength. There may be undesirable grain growth with some alloys within the cited range resulting from use of a 1650° F. (900° C.) or greater solution treatment, but strength will be improved with little change in conductivity. The solution-treated material is then cold worked to substantially finish gage, as by rolling, drawing or other metal deformation processes, to reduce the cross section thereof by at least about 50%, preferably at least about 70% to about 90% or more. The cold worked material is then aged at a temperature within the range of about 600° F. (315° C.) to about 1000° F. (540° C.), for less than about 1 to about 8 hours.

Aging acts as both a precipitation hardening and a stress-relieving heat treatment. The effect of aging is to increase strength while also greatly increasing ductility and resistance to stress relaxation of the alloy. Formability is also markedly increased. For aging temperatures below about 900° F. (480° C.) aging times of at least about 1 to about 7 hours are employed, while higher aging temperatures require about one hour or less aging time. Lower beryllium contents also require longer aging times than higher beryllium contents to achieve desirable property levels.

Examples will now be given:

A series of alloys having the compositions set forth in Table I was produced in ingot form. The ingots were converted to strip of intermediate gage by hot and cold rolling with optional intermediate anneals. The worked strip was then solution annealed at 1650° F. (900° C.) or 1700° F. (930° C.) for times of about 15 minutes or less at temperature, followed by a rapid quench to room temperature. The solution annealed strip was then cold rolled to 90% reduction in area and age hardened at 750° F. (400° C.) for the times indicated. Tensile properties, hardness and conductivity were determined and are reported in Table I which also shows the results of 90° bend formability tests and stress relaxation tests at a temperature of 300° F. (150° C.) and a initial stress of 75% of the 0.2% offset yield strength.

Table II contains the results obtained from strip made from certain alloys in Table I and additional compositions within the invention, processed as those of Table I except cold rolled 72% and aged at 750° F. (400° C.). Table III shows results for certain of these alloys cold rolled 50% prior to aging at 750° F. (400° C.).

In another example employing a higher final aging temperature for a shorter aging time than those above, an alloy with 0.34% beryllium and 0.25% cobalt, balance copper, when solution annealed at 1650° F. (900° C.), cold rolled 90% and aged 1 minute at 1000° F. (540° C.) exhibited an ultimate tensile strength of 96 ksi (662 MPa), an 0.2% offset yield strength of 88 ksi (607 MPa), an elongation of 11%, a hardness of Rockwell B90, an electrical conductivity of 43% IACS, and a longitudinal formability, R/t, of zero.

And in yet another example, an alloy containing 0.31% beryllium, 0.50% cobalt, balance copper, when solution annealed and cold worked as the preceding example and aged 20 minutes at 850° F. (455° C.), exhibited an ultimate tensile strength of 108 ksi (745 MPa), an 0.2% offset yield strength of 101 ksi (696 MPa), an elongation of 13%, a hardness of Rockwell B95, an electrical conductivity of 51% IACS, and a longitudinal formability, R/t, of zero.

TABLE I

| Heat No. | Composition % Be | % Co | Anneal F(C) | 750 F (400 C) Aging Time, Hr. | UTS ksi (MPa) | 0.2% Y.S. ksi (MPa) | Elongation % | Hardness RB | Electrical Conductivity % IACS | Min. 90° R/t Long. | Trans. | Percent Remaining Stress in 1000 hrs. at 300 F (150 C) | Figure of Merit (UTS + 2 × % IACS) |
|---|---|---|---|---|---|---|---|---|---|---|---|---|---|
| 1 | 0.06 | 0.05 | 1650 (900) | 7 | 56 (386) | 50 (345) | 9 | 56 | 78 | 0 | — | — | 212 |
| 2 | 0.08 | 0.11 | 1650 (900) | 7 | 70 (483) | 65 (448) | 9 | 79 | 69 | 0.8 | — | — | 208 |
| 3 | 0.14 | 0.20 | 1650 (900) | 5 | 84 (579) | 75 (517) | 11 | 91 | 57 | — | — | — | 198 |
| 4 | 0.13 | 0.96 | 1650 (900) | 5 | 97 (669) | 91 (627) | 12 | 94 | 46 | — | — | — | 189 |
| 5 | 0.12 | 1.88 | 1650 (900) | 7 | 92 (634) | 87 (600) | 12 | 84 | 38 | 0 | — | — | 168 |
| 6 | 0.23 | 0.24 | 1650 (900) | 7 | 100 (689) | 91 (627) | 11 | — | 63 | 0.7 | — | — | 226 |
| 7 | 0.21 | 0.32 | 1650 (900) | 7 | 109 (752) | 102 (703) | 10 | 99 | 62 | 0 | — | — | 233 |
| 8 | 0.29 | 0.07 | 1675 (910) | 5 | 80 (552) | 71 (490) | 11 | 79 | 51 | 0.6 | 3.2 | — | 182 |
| 9 | 0.31 | 0.25 | 1700 (930) | 5 | 110 (758) | 101 (696) | 11 | 95 | 41 | 0 | 6.4 | 85 | 192 |
| 10 | 0.29 | 0.26 | 1650 (900) | 5 | 107 (737) | 98 (676) | 9 | 98 | 55 | 1.5 | 6.0 | 88 | 217 |
| 11 | 0.27 | 0.35 | 1675 (910) | 5 | 114 (786) | 107 (737) | 9 | 97 | 52 | 1.2 | 6.6 | — | 218 |
| 12 | 0.30 | 0.49 | 1700 (930) | 5 | 126 (869) | 120 (827) | 7 | 101 | 55 | 0.6 | — | — | 236 |

TABLE I-continued

| Heat No. | Composition % Be | % Co | Anneal F(C) | 750 F (400 C) Aging Time, Hr. | UTS ksi (MPa) | 0.2% Y.S. ksi (MPa) | E-longa-tion % | Hard-ness RB | Electrical Conductivity % IACS | Min. 90° R/t Long. | Trans. | Percent Remaining Stress in 1000 hrs. at 300 F (150 C) | Figure of Merit (UTS + 2 × % IACS) |
|---|---|---|---|---|---|---|---|---|---|---|---|---|---|
| 13 | 0.31 | 0.60 | 1675 (910) | 5 | 128 (883) | 122 (841) | 8 | 100 | 52 | 1.3 | 7.9 | — | 232 |
| 14 | 0.29 | 0.74 | 1675 (910) | 5 | 132 (910) | 127 (876) | 7 | 100 | 53 | 1.8 | 6.6 | — | 238 |
| 15 | 0.28 | 1.02 | 1675 (910) | 5 | 130 (896) | 125 (862) | 7 | 100 | 53 | 1.8 | 6.6 | — | 236 |
| 16 | 0.28 | 1.21 | 1650 (900) | 7 | — | — | — | 100 | 55 | — | — | — | — |
| 17 | 0.29 | 1.48 | 1675 (910) | 5 | 125 (862) | 121 (834) | 7 | 99 | 47 | 1.2 | 4.8 | — | 219 |
| 18 | 0.29 | 1.80 | 1650 (900) | 7 | 116 (800) | 113 (779) | 11 | 97 | 47 | 0 | — | — | 210 |
| 19 | 0.50 | 0.25 | 1650 (900) | 3 | 110 (758) | 102 (703) | 12 | 99 | 42 | 0 | 4.6 | 76 | 194 |
| 20 | 0.50 | 0.50 | 1650 (900) | 5 | 108 (745) | 98 (676) | 13 | 98 | 44 | — | — | — | 196 |
| 21 | 0.48 | 1.21 | 1650 (900) | 0.5 | 135 (928) | 130 (894) | 6 | 102 | 45 | 2.1 | — | — | 225 |
| 22 | 0.47 | 1.80 | 1650 (900) | 5 | 135 (928) | 130 (894) | 7 | 102 | 54 | 3.2 | — | — | 243 |

TABLE II

| Heat No. | Composition % Be | % Co. | Anneal F(C) | 750 F (400 C) Aging Time, Hr. | UTS Ksi (MPa) | 0.2% Y.S. Ksi (MPa) | E-longa-tion % | Hardness RB | Electrical Conductivity % IACS | Min. 90° R/t Long. | Trans. | Percent Remaining Stress in 1000 hrs. at 300 F (150 C) |
|---|---|---|---|---|---|---|---|---|---|---|---|---|
| 3 | 0.14 | 0.20 | 1650 (900) | 7 | 65 (448) | 57 (393) | 11 | 76 | 68 | — | — | — |
| 4 | 0.13 | 0.96 | 1650 (900) | 5 | 89 (614) | 80 (552) | 14 | 89 | 48 | — | — | — |
| 6 | 0.23 | 0.24 | 1650 (900) | 5 | 97 (669) | 86 (593) | 12 | 94 | 63 | — | — | — |
| 7 | 0.21 | 0.32 | 1650 (900) | 5 | 104 (717) | 94 (648) | 12 | 97 | 61 | — | — | — |
| 9 | 0.31 | 0.25 | 1700 (930) | 5 | 103 (710) | 96 (662) | 5 | 94 | 48 | 1.3 | 5.6 | — |
| 23 | 0.41 | 0.25 | 1650 (900) | 5 | 101 (696) | 93 (641) | 10 | 100 | 42 | — | — | — |
| 24 | 0.38 | 1.01 | 1650 (900) | 3 | 128 (882) | 120 (827) | 9 | 100 | 52 | — | — | — |
| 19 | 0.50 | 0.25 | 1650 (900) | 3 | 105 (724) | 94 (648) | 8 | 98 | 40 | 1.0 | 9.0 | 88 |

TABLE III

| Heat No. | Composition % Be | % Co. | Anneal F(C) | 750 F (400 C) Aging Time, Hr. | UTS ksi (MPa) | 0.2% Y.S. ksi (MPa) | E-longa-tion % | Hardness RB | Electrical Conductivity % IACS | Min. 90° R/t Long. | Trans. | Percent Remaining Stress in 1000 hrs. at 300 F (150 C) |
|---|---|---|---|---|---|---|---|---|---|---|---|---|
| 9 | 0.31 | 0.25 | 1700 (930) | 5.5 | 95 (655) | 88 (607) | 4 | 87 | 46 | 1.4 | 2.4 | — |
| 19 | 0.50 | 0.25 | 1650 (900) | 3 | 100 (689) | 88 (607) | 11 | 97 | 41 | 0.5 | 1.0 | 82 |

Figure 6:
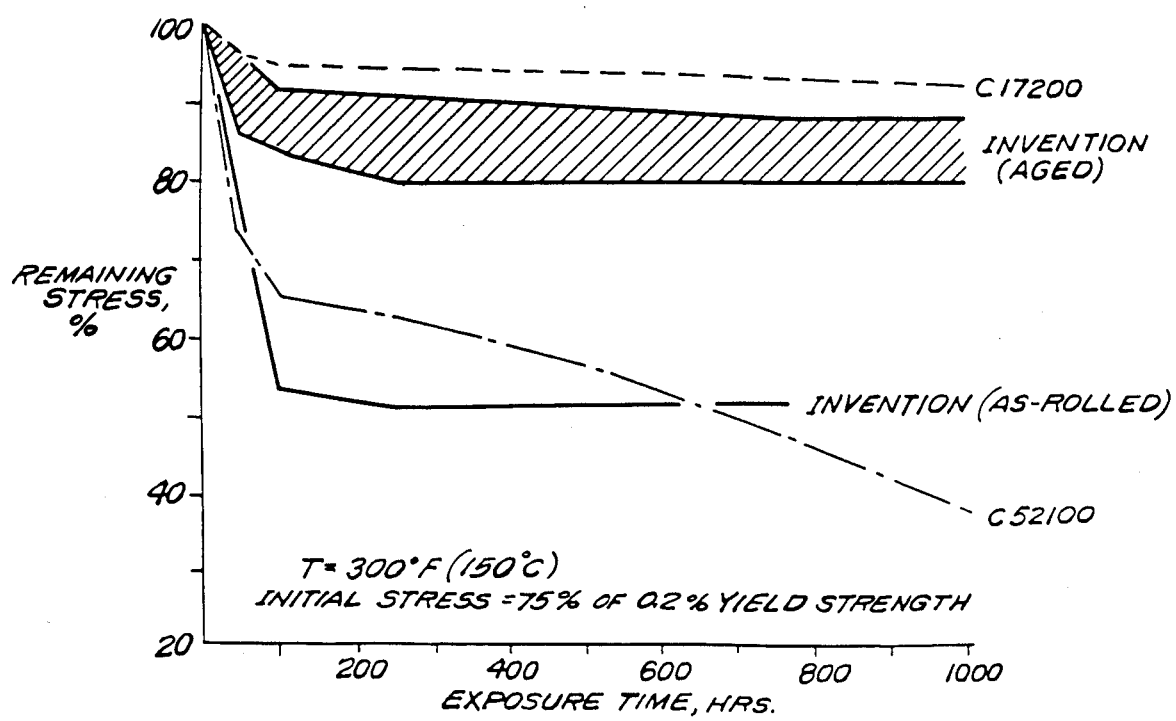
FIG. 6 depicts the stress relaxation curve at a temperature of 300 F (150° C.) and an initial stress of 75% of the 0.2% offset yield strength for strip made from alloys within the invention having 0.3% beryllium to 0.5% beryllium, 0.25% cobalt, balance essentially copper, solution annealed and cold rolled as provided in the invention, and tested both with and without final age hardening. A "stress remaining" value of 80% or more was attained. Copper-base alloys of the prior art, e.g., C17200 and C52100, are provided for comparison.
Figure 2:
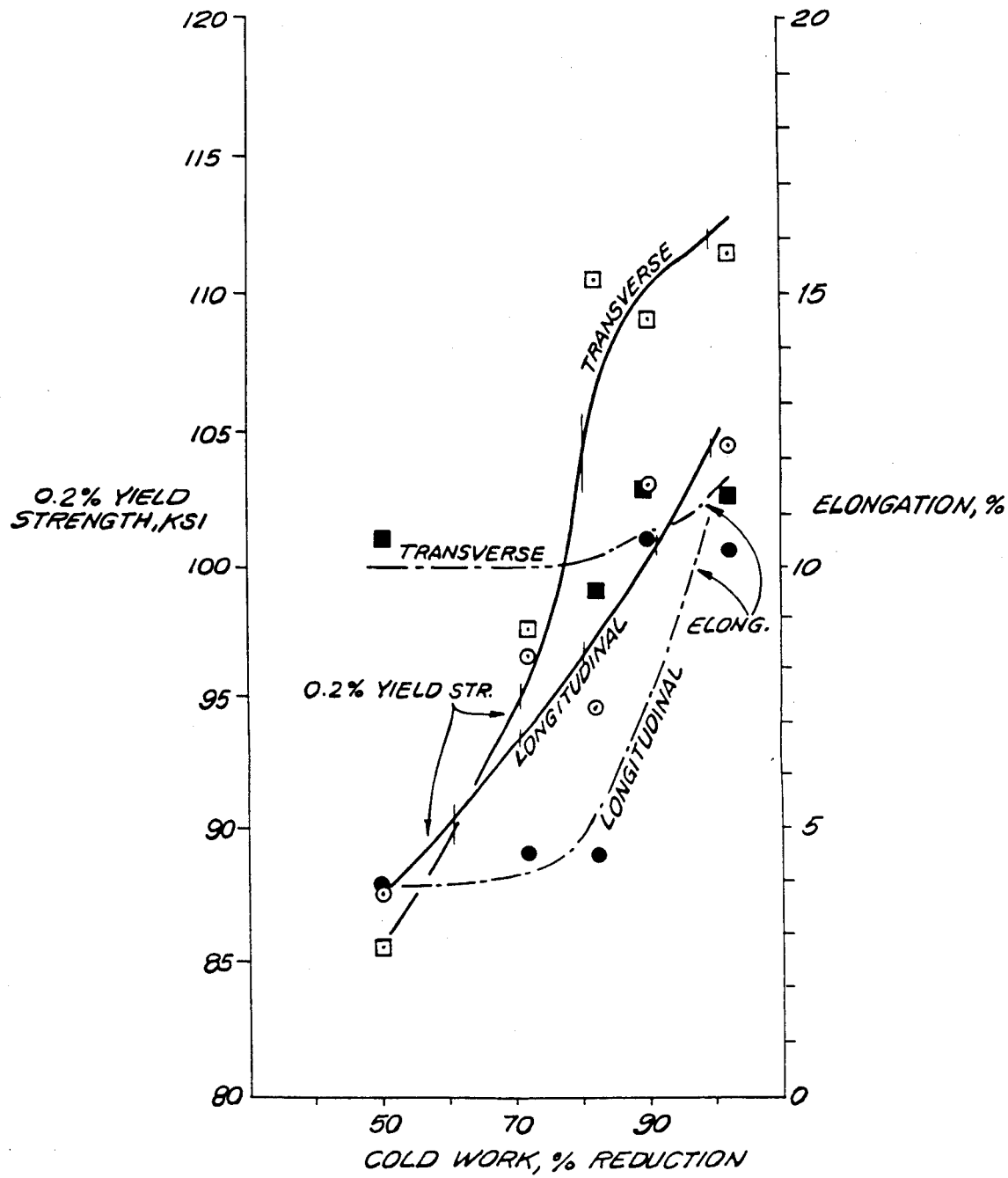
FIG. 2 depicts both the longitudinal and transverse orientation strength and ductility of strip made from the alloy of FIG. 1 after solution annealing at 1700° F. (930° C.), cold rolling various amounts between 50% and 96% reduction in area, and age hardening 5.5 hours at 750° F. (400° C.)
Figure 3:
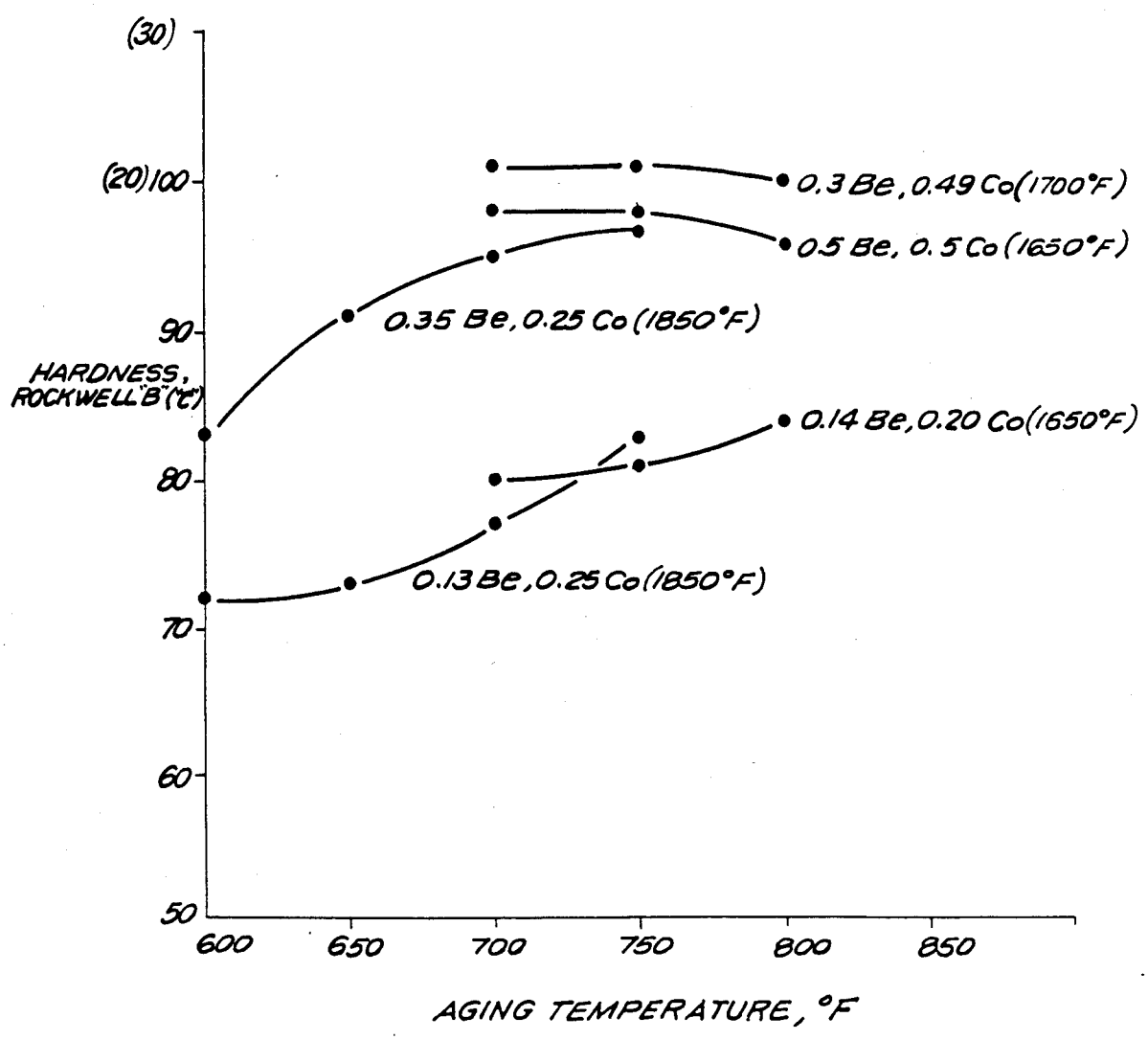
FIG. 3 depicts the influence of various age hardening temperatures from 600° F. to 850° F. (315° C. to 450° C.), at a fixed aging time of 3 hours, on the hardness of strip made from various copper-cobalt-berylliu alloys within the range of the invention after solution annealing at a variety of temperatures in the range 1600° F. to 1850° F. (870° C. to 1000° C.) and cold rolling 72% reduction in area.
Figure 4:
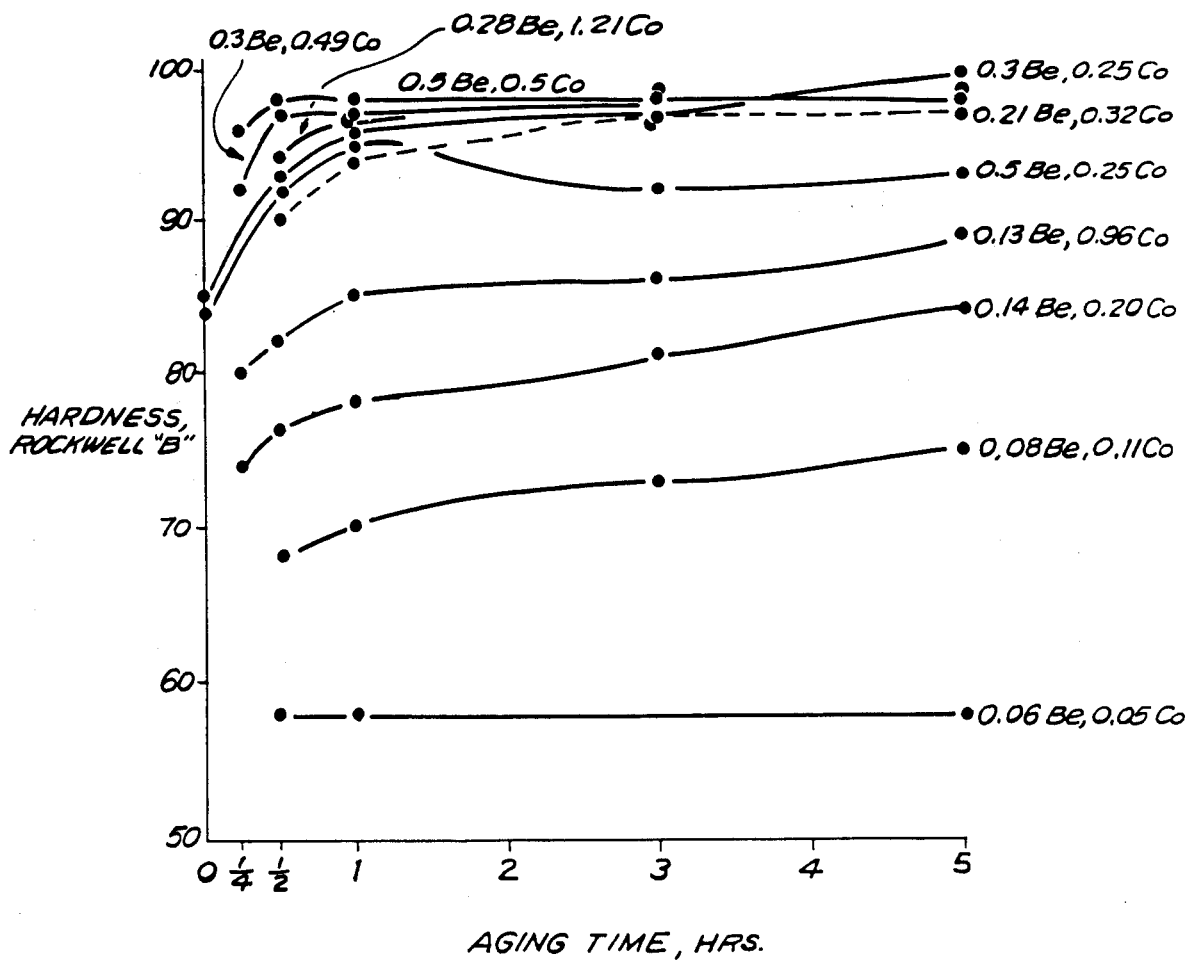
FIG. 4 depicts the influence of aging time at a fixed aging temperature of 750° F. (400° C.) on the hardness of strip made from various alloys within the range of the invention after solution annealing at 1650° F. (900° C.) and cold rolling 90% reduction in area.
Figure 5:
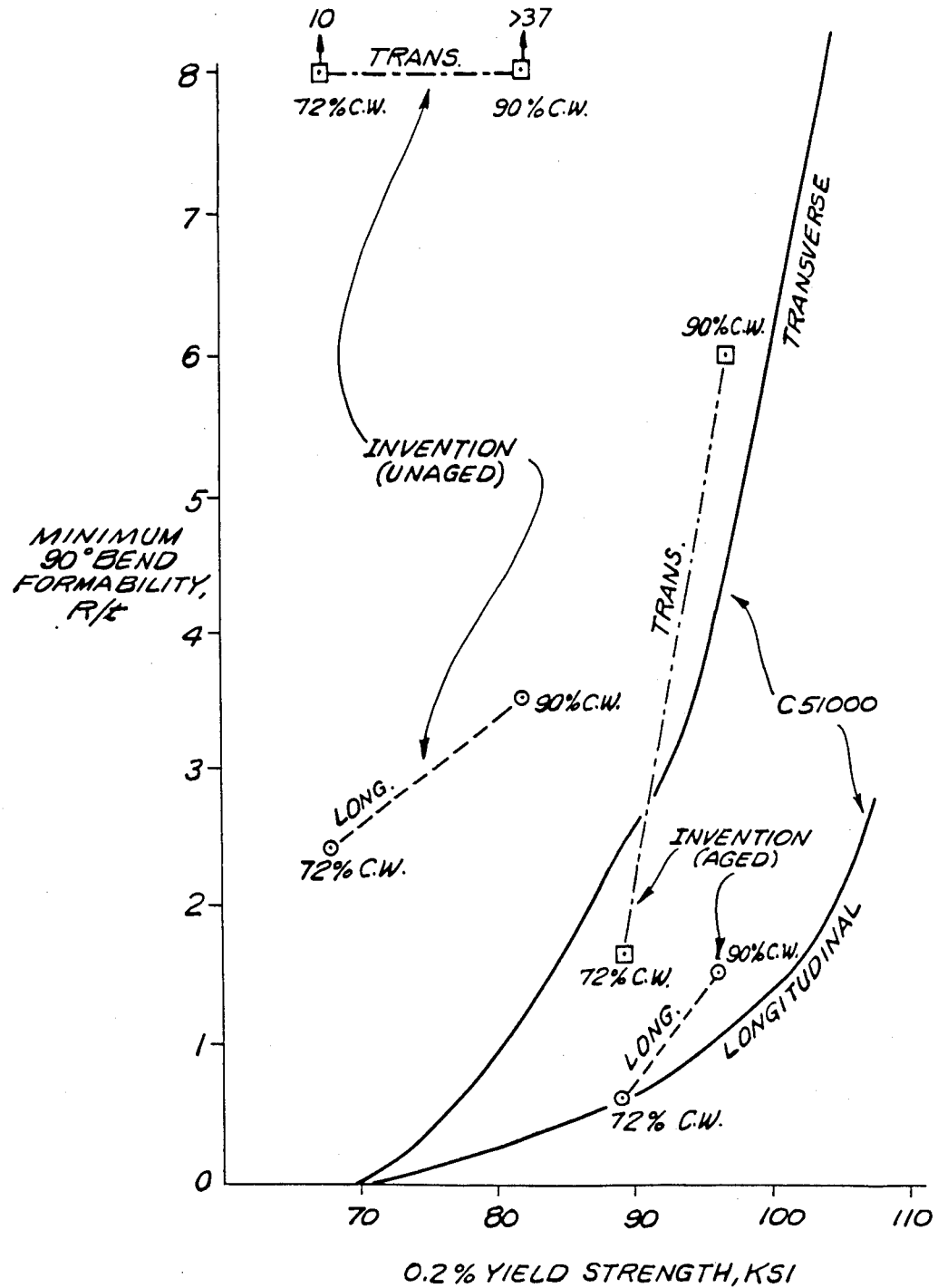
FIG. 5 depicts the longitudinal and transverse orientation formability vs strength relationships of strip made from an alloy within the range of the invention containing 0.3% beryllium, 0.25% cobalt, balance essentially copper, solution annealed at 1650° F. (900° C.) and cold rolled both 72% and 90% reduction in area, in both the as-rolled and the cold rolled plus age hardened 5 hours at 750° F. (400° C.) conditions, compared to a non-precipitation hardenable alloy of the prior art, e.g., C51000 phosphor bronze.

The role of the final aging treatment in improving the properties of these solution annealed and heavily cold rolled alloys is demonstrated in FIG. 1 where a near-50% improvement in strength and a two-fold increase in ductility are observed in 72% cold rolled 0.35% beryllium, 0.25% cobalt, balance essentially copper strip upon aging at 750° F. (400° C.); and is further illustrated in FIG. 6 where solution annealed, 90% cold rolled and unaged 0.31% beryllium, 0.25% cobalt, balance essentially copper strip exhibits 2½ times greater loss of an initial stress of 75% of the 0.2% yield strength after 1000 hours at 300° F. (150° C.) than the same strip after aging at 750° F. (400° C.). Stress relaxation resistance of the annealed, cold worked and aged alloys of the invention approaches that of the higher strength precipitation hardened alloys of the prior art, e.g., C17200, while the alloys of the invention prior to age hardening behave similarly to the non-precipitation hardenable, cold worked alloys of the prior art, e.g., C51000 and C52100. Usually, a "stress remaining" value of at least about 75% to about 80% in the aforesaid stress relaxation test is achieved in alloys treated in accordance with the invention.

Inspection of these examples reveals that at least about 0.15% to about 0.2% beryllium and about 0.1% or about 0.2% cobalt, balance copper are necessary to achieve desirable combinations of electrical conductivity exceeding about 40% IACS and strength exceeding about 70 ksi (480 MPa) 0.2% offset yield strength when processed per the invention, and that no significant improvement in strength beyond about 130 ksi (900 MPa) can be obtained for beryllium content beyond about 0.5% and cobalt content beyond about 1.8% to about 2%, balance copper, when processed per the invention. As shown by Alloy No. 6, a yield strength of 100 ksi is provided when an alloy containing only 0.23% beryllium and only 0.2% cobalt is processed in accordance with the invention.

It is usually found from inspection of the data set forth in Table I that alloys containing approximately 0.3% beryllium and cobalt over the range shown, when treated comparably, exhibit steeply increasing strength up to a cobalt content of approximately 1%; and increasing cobalt beyond about 1% results in reduced strength as well as conductivity.

Another means of evaluating cobalt beryllium alloys which has been used in the art is an arbitrary "Figure of Merit" defined as the ultimate tensile strength (ksi) plus two times the electrical conductivity (% IACS). This quantity has been detailed and provided in Table I. Again, inspection of the data demonstrates that the Figure of Merit increases sharply with cobalt content (at a beryllium content of 0.3%) with a plateau in value in the region of 0.5% to 1.5% cobalt, after which the value decreases as cobalt is increased. Both strength and Figure of Merit are maximized at about 1% cobalt.

Alloys processed in accordance with the invention, will generally have 0.2% offset yield strengths on the order of about 85 ksi (580 MPa) to about 120 ksi (825 MPa), tensile strengths of about 95 ksi (655 PMa) to about 125 ksi (860 MPa), elongations of about 5% to about 15%, conductivities of about 40% IACS to about 65% IACS and a "stress remaining" after 1000 hours at 300° F. (150° C.) in the stress relaxation test of at least about 85% of an initial stress equal to 75% of the 0.2% offset yield strength. In comparison, non-agehardenable strip (e.g., phosphor bronze alloy C51000) at about the same strength level displays a "remaining stress" value not exceeding 37% in the stress relaxation test for 1000 hours at 300° F. (150° C.), an elongation not exceeding 5%, formability (R/t) values of about 2.5 longitudinal and about 9 transverse, with a conductivity of only about 15% IACS.

Wrought forms processed in accordance with the invention are useful for current-carrying springs, mechanical springs, diaphragms, switch blades, contacts, connectors, terminals, fuse clips, bellows, die casting plunger tips, sleeve bearings, tooling to mold plastics, oil/coal drilling equipment components, resistance welding electrodes and components, lead frames, etc.

In addition to useful articles fabricated from alloy strip, plate, rod, bar and tube processed to finished form by the annealing, cold working and age hardening processes of the invention, we also recognize other approaches to the fabrication of such articles which lie within the scope of the invention. Thus clad, roll bonded, or inlaid strip or wire; wherein a layer of a first wrought metallic substance, e.g., a copper-base alloy, a nickel-base alloy, an iron-base alloy, a chromium-base alloy, a cobalt-base alloy, an aluminum-base alloy, a silver-base alloy, a gold-base alloy, a platinum-base alloy or a palladium-base alloy, or any combination of two or more of the above is metallurgically joined to a substrate of a second metallic substance consisting of a copper beryllium alloy within the range of the invention; may be fabricated by placing the layer or layers of said first metallic substance or substances in contact with the suitably cleaned surface of said solution annealed second metallic substance, cold rolling (or, in the case of wire, drawing) the superimposed metallic substances to a heavy reduction within the range of the invention, e.g., 50% to 70% or even 90% or more, to effect a cold weld, then age hardening the resultant multi-layered strip or wire within the range of the invention, e.g., 600° F. to 1000° F. (315° C. to 540° C.) for less than one hour to about 8 hours, to produce a desirable combination of strength, ductility, formability, conductivity and stress relaxation resistance in the substrate copper beryllium material.

Additionally, useful articles may be fabricated from alloys within the invention wherein the substantially final form of the article is produced by heavy cold working, e.g., cold forging, cold swaging, cold coining, or cold heading, the solution annealed and optionally partially cold rolled or drawn wrought alloy strip, plate, rod, bar, wire or forging blank to final dimensions to effect a total degree of cold work in the alloy within the range of the invention, e.g., 50% to about 70% or 90% or more, then age hardening the cold formed final article within the range of the invention, e.g., 600° F. to 1000° F. (315° C. to 540° C.) for less than one to about 8 hours, to impart to the final articles desirable property combinations of the alloys within the invention.

Although the present invention has been described in conjunction with preferred embodiments, it is to be understood that modifications and variations, may be resorted to without departing from the spirit and scope of the invention, as those skilled in the art will readily understand. Such modifications and variations are considered to be within the purview and scope of the invention and appended claims.

What is claimed is:

1. The method for producing copper beryllium alloy material made from an alloy consisting essentially from about 0.2% to about 0.5% beryllium, about 0.2% to about 1% cobalt and the balance essentially copper which comprises providing said alloy in a wrought intermediate form, solution treating said alloy at a temperature between about 1450° F. (790° C.) and about 185° F. (1000° C.) for a time sufficient to effect recrystallization and solid solution of that portion of the alloying elements capable of contributing to precipitation hardening, final cold working the solution treated alloy to at least about 50% reduction in area and aging the cold worked alloy at a temperature of about 600° F. (315° C.) to about 1000° F. (540° C.) for less than one hour to about eight hours to effect precipitation hardening with accompanying substantial increase in stress relaxation resistance, ductility, conductivity and strength.

2. The process in accordance with claim 1 wherein said solution treatment is accomplished at a temperature within the range of about 1500° F. (815° C.) to about 1700° F. (930° C.).

3. The process in accordance with claim 1 wherein said solution treatment is accomplished at a temperature with the range of about 1600° F. (870° C.) to about 1650° F. (900° C.).

4. The process in accordance with claim 1 wherein said alloy contains about 0.5% to about 1% cobalt.

5. The process in accordance with claim 1 wheresaid said cold working is at least 70%.

6. A copper beryllium alloy consisting essentially of about 0.2% to about 0.5% beryllium, about 0.2% to about 1% cobalt and the balance essentially copper in the condition resulting from solution treating in a temperature range of about 1450° F. (790° C.) to about 1850° F. (1000° C.), cold working said solution treated alloy to effect at least about 50% reduction, and aging said cold worked alloy at a temperature in the range of about 600° F. (315° C.) to about 1000° F. (540° C.) to effect precipitation hardening; said alloy then being characterized by a percent remaining stress of at least about 80%, good formability, ductility, conductivity and high strength.

7. A copper beryllium alloy in accordance with claim 6 containing about 0.5% to about 1% cobalt.

8. A contact element made from the alloy of claim 6.

* * * * *

UNITED STATES PATENT AND TRADEMARK OFFICE
CERTIFICATE OF CORRECTION

PATENT NO. : 4,724,013

DATED : February 9, 1988

INVENTOR(S) : Nathan L. Church et al

It is certified that error appears in the above-identified patent and that said Letters Patent is hereby corrected as shown below:

IN THE CLAIMS:

Claim 1 of the patent, column 10, line 28, "185$^c$F" should be -- 1850$^o$F -- .

Signed and Sealed this

First Day of November, 1988

Attest:

DONALD J. QUIGG

Attesting Officer     Commissioner of Patents and Trademarks